United States Patent
Chou et al.

(10) Patent No.: US 12,132,980 B2
(45) Date of Patent: Oct. 29, 2024

(54) DYNAMIC IMAGE PROCESSING METHOD, ELECTRONIC DEVICE, AND TERMINAL DEVICE CONNECTED THERETO

(71) Applicant: COMPAL ELECTRONICS, INC., Taipei (TW)

(72) Inventors: Pin-Yu Chou, Taipei (TW); Yueh-Hua Lee, Taipei (TW); Yu-Ning Chang, Taipei (TW); Ming-Hsien Wu, Taipei (TW); Yu-Syuan Huang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 190 days.

(21) Appl. No.: 17/973,559

(22) Filed: Oct. 26, 2022

(65) Prior Publication Data

US 2023/0396869 A1 Dec. 7, 2023

(30) Foreign Application Priority Data

Jun. 6, 2022 (TW) .................................. 111120906

(51) Int. Cl.
| | |
|---|---|
| *H04N 23/611* | (2023.01) |
| *G06T 7/20* | (2017.01) |
| *H04N 7/18* | (2006.01) |
| *H04N 23/60* | (2023.01) |

(52) U.S. Cl.
CPC ............. *H04N 23/611* (2023.01); *G06T 7/20* (2013.01); *H04N 7/183* (2013.01); *H04N 23/64* (2023.01)

(58) Field of Classification Search
CPC ...... H04N 23/611; H04N 7/183; H04N 23/64; G06T 7/20; G06T 7/70; G06T 2207/20084; G06T 2207/30201; G06T 2207/30232; G11B 27/031; G11B 27/28
See application file for complete search history.

(56) References Cited

U.S. PATENT DOCUMENTS

| | | | |
|---|---|---|---|
| 10,777,228 B1* | 9/2020 | Wilson | G11B 27/02 |
| 11,941,039 B2* | 3/2024 | Mestres | G06F 16/432 |
| 2021/0125035 A1* | 4/2021 | Wachira | A01K 57/00 |
| 2021/0289266 A1* | 9/2021 | Zhang | H04N 21/47217 |
| 2023/0229699 A1* | 7/2023 | Wu | G06F 16/783 |
| 2023/0252784 A1* | 8/2023 | Ahmed | G06V 10/82 382/103 |
| 2023/0377606 A1* | 11/2023 | Balko | G11B 27/309 |
| 2024/0055025 A1* | 2/2024 | Schreiber | H04N 21/47815 |
| 2024/0078279 A1* | 3/2024 | Millan Harfuch | G09B 21/00 |
| 2024/0185405 A1* | 6/2024 | Takada | G06T 7/0002 |

* cited by examiner

*Primary Examiner* — Hung H Lam

(57) ABSTRACT

A dynamic image processing method is executed by an electronic device communicating with a photographing device and reading an executable code to identify a preset object by using artificial intelligence, and perform dynamic image processing for the preset object. The method includes the steps of identifying the preset object, image filtering and forming a concatenated video. In the step of image filtering, a filter condition is set, the filter condition includes detecting a movement variable of the preset object in the initial image, and when the filter condition meets a threshold, a catch moment in the initial image is selected. In the step of forming a concatenated video, at least one video clip in the initial image is selected according to the catch moment, and the video clip is assembled to form the concatenated video. The present disclosure also provides an electronic device and a terminal device.

16 Claims, 16 Drawing Sheets

| Moment Type | View Angle | Environment Sound dB value | Baby in the Scene | Movement Variable MLI value | Movement Variable MP value | Person Classification amount of infants/young children | Person Classification amount of adults | Facial Expression amount of human faces | Event |
|---|---|---|---|---|---|---|---|---|---|
| | | | present or not | | | | | | |
| Movement (sustained movement) detection of infant/young child | top view/ side view | more than 65dB | present | 45% < MLI < 70% | 10% < MPI < 31% | equal to 1 | 0 | 1 | crying sound detected |
| Movement (real time movement) detection of infant/young child | top view | less than 50dB | present | 45% < MLI < 70% | 0% < MPI < 5% | 1 | 0 | 1 | no crying sound detected |
| Detection of multiple people (one infant and one adult) | top view/ side view | | present | 10% < MLI | | 1 | 0 | 2 | |
| Detection of multiple people (at least two infants) | side view | more than 65 dB | present | 10% < MLI | 10% < MPI < 31% | 2 or more | 0 | 1 or more | no crying sound detected |
| Detection of multiple people (at least one infant and at least two adults) | side view | less than 65 dB | present | | | 1 or more | 2 or more | 3 or more | no crying sound detected |

201

FIG. 10 movement detection mode (√)

(X)

(X)

DYNAMIC IMAGE PROCESSING METHOD, ELECTRONIC DEVICE, AND TERMINAL DEVICE CONNECTED THERETO

CROSS-REFERENCE TO RELATED APPLICATION

This non-provisional application claims priority under 35 U.S.C. § 119(a) on Patent Application No(s). 111120906 filed in Taiwan, R.O.C. on Jun. 6, 2022, the entire contents of which are hereby incorporated by reference.

BACKGROUND OF THE INVENTION

1. Field of the Invention

The present disclosure relates to a dynamic image processing technology, and in particular to a dynamic image processing method, an electric device and a terminal device connected thereto.

2. Description of the Related Art

In a conventional monitoring system for infants and young children, a camera automatically captures images through artificial intelligence recognition, and conditions for capturing images are mainly based on changes in facial expressions or voices. However, the conventional monitoring system has the following problems:

1. In the conventional monitoring system, the images automatically captured by the camera do not take into account the variation in movements of the infant's body, such that many of the captured images have similar expressions (such as the same smiling face) or many of the videos have similar voices (such as the same laughter), but there is no obvious movement change in the body. That is, even if the above-mentioned conditions for capturing images are met, a lot of images with monotonous body movements and repetitive content are captured, and unsatisfactory ones must be manually removed from these images.

2. Even though the conventional monitoring system can use the changes of facial expressions or voices as the conditions for capturing images, it cannot sort and filter the level of expressions or voices. For example, smiley faces are chosen with the one who laughs ahead of the one who smiles (or vice versa), and the selection of laughter is given priority to high decibels over low decibels (or vice versa). Similarly, unsatisfactory ones need to be manually removed from these images.

3. The conventional monitoring systems usually only target infants and young children for image capture. When there are two or more people in the image, for example, one infant and one adult, the conventional monitoring system usually only takes the change of the infant's facial expression or voice as the conditions for capturing images. At this time, if the capture conditions are met, but there is only the adult's body and no face in the shot, the image will still be selected, but it will absolutely be unsatisfactory.

Therefore, the present disclosure provides solutions for solving the above drawbacks.

BRIEF SUMMARY OF THE INVENTION

The present disclosure provides a dynamic image processing method, an electric device and a terminal device connected thereto. In the present disclosure, a movement variable is used as a filter condition in order to achieve a more dynamic action performance in the selected video content.

To achieve the above-mentioned purpose, the present disclosure provides a dynamic image processing method, which is executed by an electronic device communicating with a photographing device and reading an executable code to identify a preset object by using artificial intelligence, and perform dynamic image processing for the preset object. The dynamic image processing method includes the following steps of: identifying the preset object, wherein the preset object is recognized by artificial intelligence from an initial image captured by the photographing device; image filtering, wherein a filter condition is set, the filter condition includes detecting a movement variable of the preset object in the initial image, and when the filter condition meets a threshold, a catch moment in the initial image is selected; and forming a concatenated video, wherein at least one video clip in the initial image is selected according to the catch moment, and the at least one video clip is assembled to form the concatenated video.

In an embodiment, the movement variable includes a movement level index (MLI) and a movement proportion index (MPI), and the threshold includes a first threshold and a second threshold, wherein from a first number of frames containing the preset object within a predetermined period of time in the initial image, a difference value between a first area occupied by the preset object in an Nth frame of image and a second area occupied by the preset object in an N−1th frame of image is calculated, and the difference value is divided by the first area to obtain the movement level index; a number of the frames which have the difference value greater than the first threshold are defined as a second number of frames, and the second number of frames are compared with the first number of frames to obtain the movement proportion index; and the filter condition is met when movement proportion index is greater than the second threshold.

In an embodiment, the first area and the second area are respectively a rectangular area enclosed by four boundary points, and the rectangular area is defined as a smallest area which covers the preset object.

In an embodiment, the preset object is an infant or a young child, and the filter condition further includes the initial image at least having a face of the infant.

For example, the preset object is an infant in the following embodiments. In an embodiment, the filter condition further includes an ambient volume measured from the infant, and the filtering condition further includes that the ambient volume is within a volume range.

In an embodiment, the video clip is selected based on a score of the infant's facial expression at the catch moment, and a highest score is selected; or the video clip is selected based on a value of the movement level index at the catch moment, and a highest value is selected; or the video clip is selected based on a face area of the preset object at the catch moment, and a largest face area is selected.

In an embodiment, the preset object includes at least one infant and at least one adult, the filter condition further includes calculating an amount of faces of the infant and the adult and an amount of bodies of the infant and the adult, and the filter condition further includes comparing the rectangular area occupied by each of the infant and the adult in the frame when the amount of faces is not less than the amount of bodies, and using a bigger area to calculate the movement level index.

In an embodiment, in the step of image filtering, based on the catch moment at which the video clip is selected, other catch moments of similar videos within a predetermined time before and/or after the catch moment are set to be excluded.

In an embodiment, in the step of forming the concatenated video, a start point of the video clip is set at a first time point which is a time period before the catch moment, and/or an end point of the video clip is set at a second time point which is the time period after the catch moment.

In an embodiment, there are multiple catch moments, multiple video clips respectively selected at the multiple catch moments are stored in the electronic device and/or a cloud database, and the multiple video clips are concatenated into the concatenated video.

The present disclosure further provides an electronic device for processing dynamic images, in which the electronic device communicates with a photographing device and a database, the database receives an initial image captured by the photographing device and uses artificial intelligence to identify a preset object, and the electronic device performs dynamic image processing on the preset object. The electronic device includes an intelligent processing unit, electrically connected to the photographing device or the database for reading the initial image and reading and executing an executable code to set a filter condition for selecting a catch moment in the initial image when a threshold is met, wherein the filter condition includes a movement variable, and the intelligent processing unit selects at least one video clip according to the catch moment and assembles the at least one video clip to form a concatenated video.

The present disclosure further provides a terminal device for communicating with the electronic device, wherein the terminal device carries an application program, and the terminal device executes the application program to receive a push broadcast of the concatenated video from the electronic device.

According to the present disclosure, the filter condition includes a movement variable, such that a more dynamic video of the preset object can be generated to meet the user's expectation.

Further, users can select high or low levels of motion changes, facial expressions and/or voices from the filter conditions according to their personal needs, such that the generated video concatenation can meet the user's expectations.

In addition, when there are two or more preset objects, the filter condition is set as that the amount of faces is not less than the amount of bodies. Thus, when there are multiple preset objects in the generated concatenated video, it ensures that the face of each preset object can be seen in the video clip at the catch moment, which can meet the user's expectation.

BRIEF DESCRIPTION OF THE DRAWINGS

FIG. 10 is a schematic view showing relevant data in the background of the electronic device according to an embodiment of the present disclosure.

DETAILED DESCRIPTION OF THE INVENTION

Figure 1:
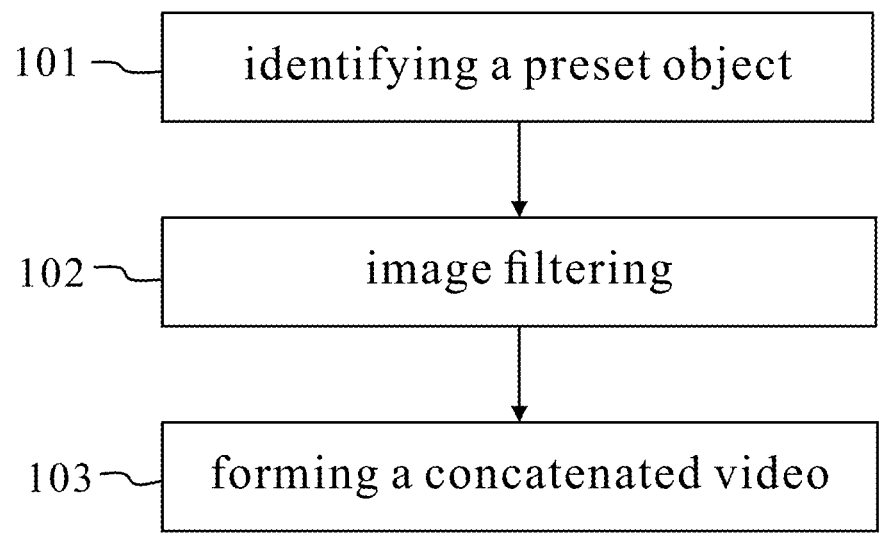
FIG. 1 is a flow chart showing main steps of the processing method according to an embodiment of the present disclosure.

To facilitate understanding of the object, characteristics and effects of this present disclosure, embodiments together with the attached drawings for the detailed description of the present disclosure are provided.

Referring to FIG. 1 to FIG. 16, the present disclosure provides a dynamic image processing method 100, an electronic device 200 and a terminal device 300 connected to the electronic device 200. The processing method 100 includes the step 101 of identifying a preset object, the step 102 of image filtering and the step 103 of concatenating videos. The electronic device 200 includes an intelligent processing unit 10 and a wireless communication unit 20.

Figure 2:
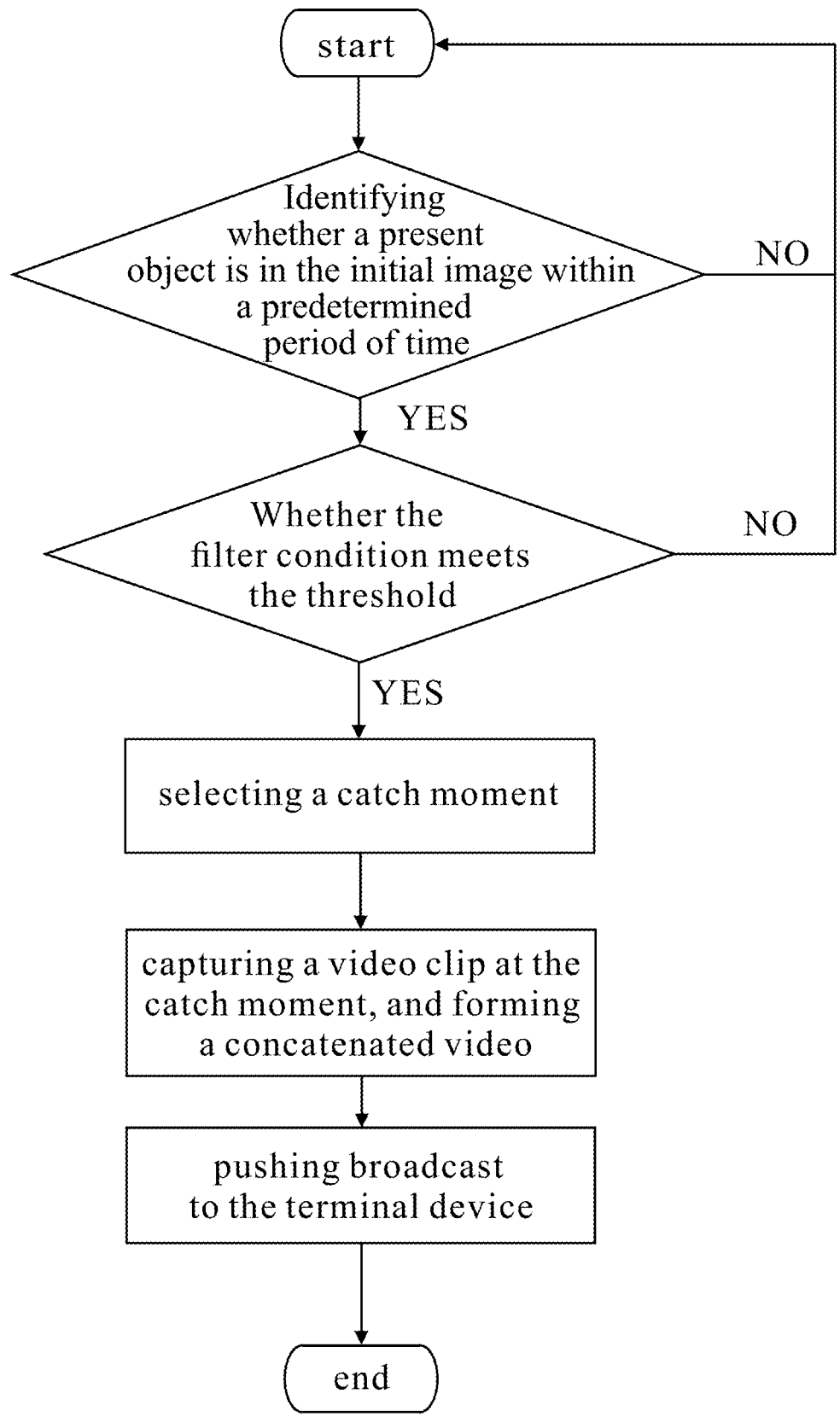
FIG. 2 is a block diagram showing the steps of the processing method according to an embodiment of the present disclosure.

The processing method 100 is executed by the electronic device 200 reading an executable code to identify a preset object P by using artificial intelligence, and perform dynamic image processing for the preset object P, thereby performing the step 101 of identifying a preset object, the step 102 of image filtering and the step 103 of concatenating videos as shown in FIG. 1. Referring to FIG. 2, the step 101 of identifying a preset object is mainly to identify whether there is a preset object in the initial image within a predetermined time; the step 102 of image filtering is mainly to identify whether the filter condition meets the threshold, and select the catch moment; and the step 103 of concatenating videos is performed on the video clip selected at the catch moment to form a concatenated video. The concatenated video can be pushed to the terminal device 300.

Figure 3:
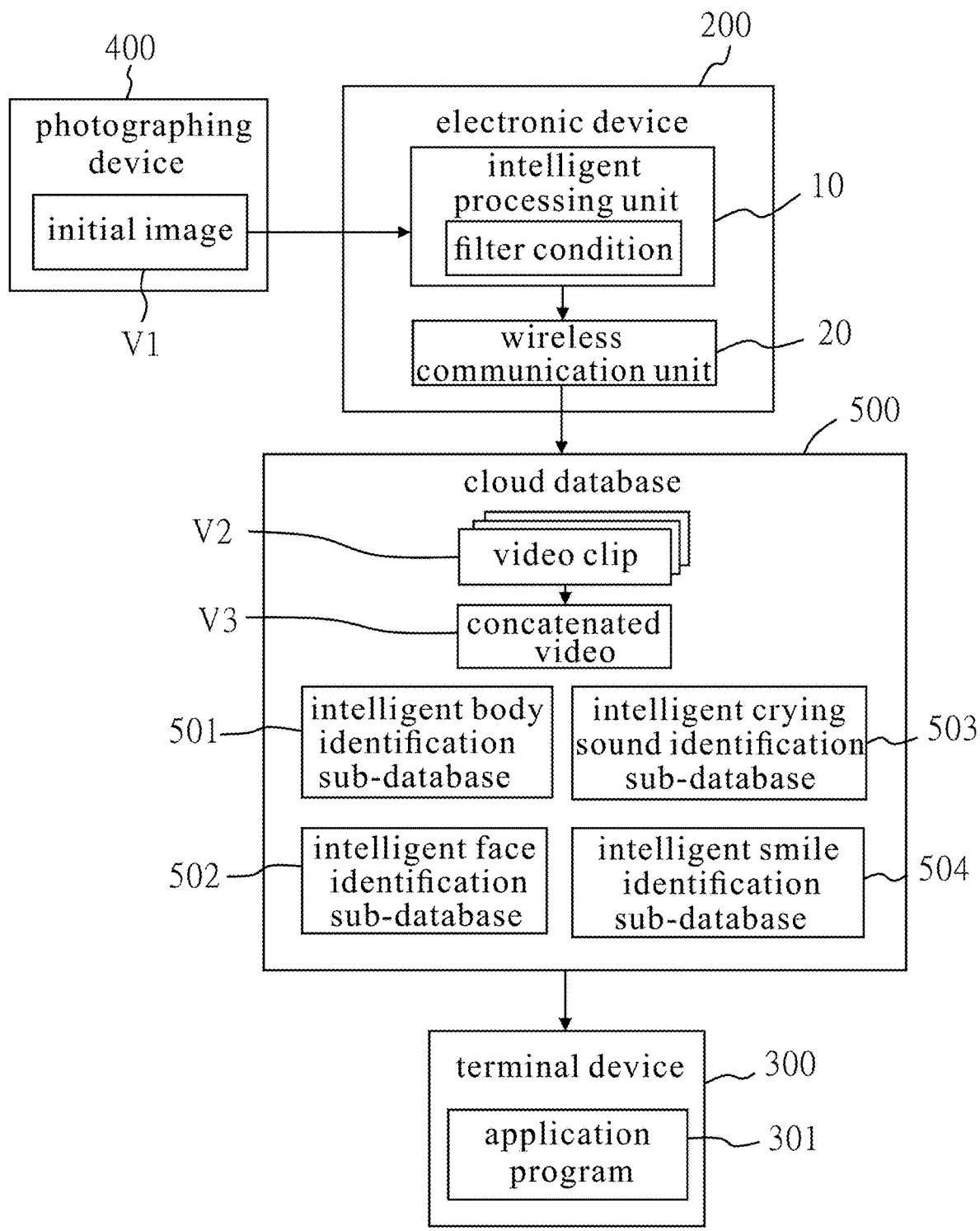
FIG. 3 is a block diagram showing an electronic device according to an embodiment of the present disclosure.
Figure 4:
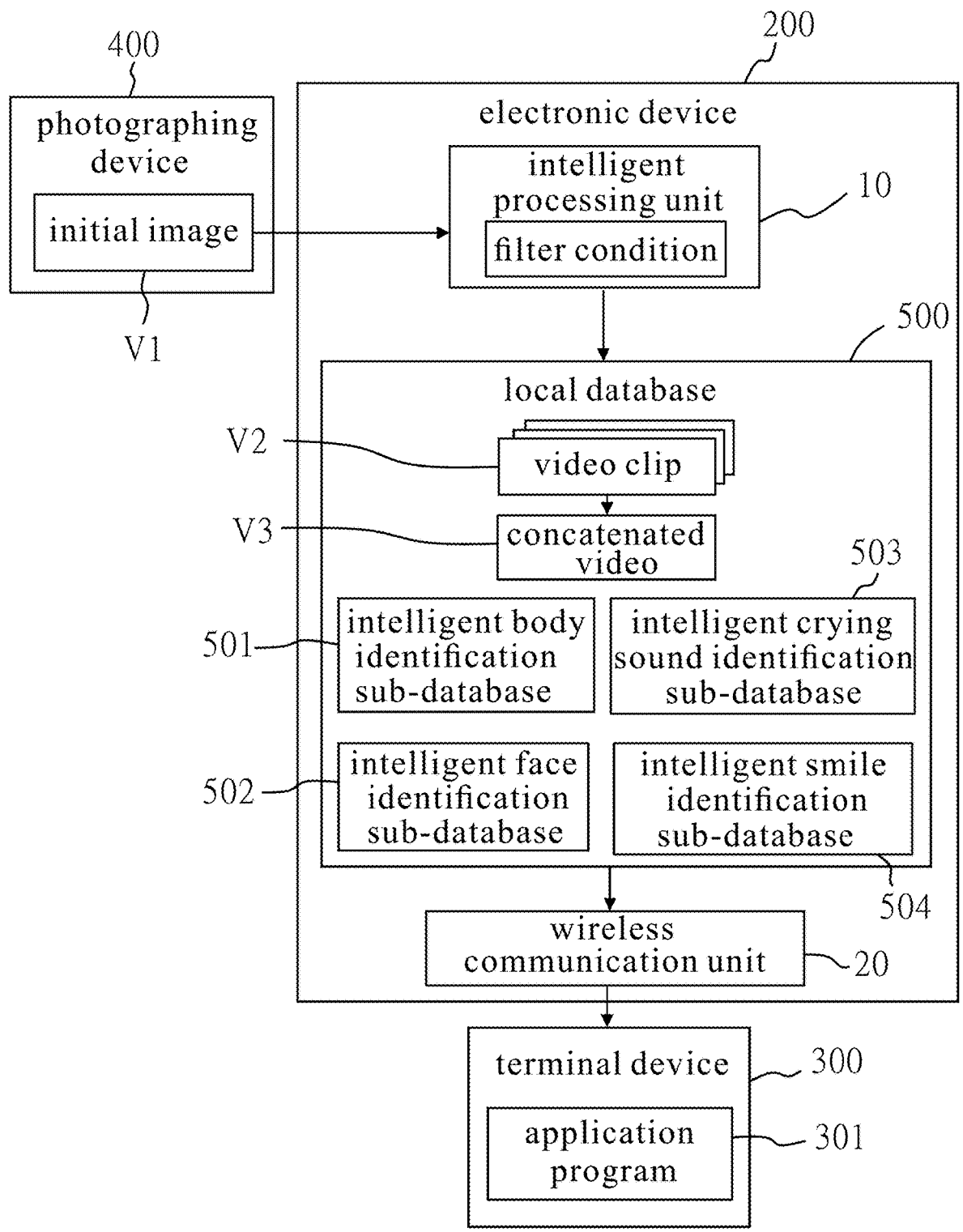
FIG. 4 is a block diagram showing an electronic device according to another embodiment of the present disclosure.

As shown in FIG. 3 and FIG. 4, the electronic device 200 communicates with a photographing device 400 and a database 500. The database 500 receives an initial image V1 captured by the photographing device 400 and uses artificial intelligence to identify a preset object P, and the electronic device 200 performs dynamic image processing on the preset object P. The intelligent processing unit 10 is electrically connected to the photographing device 300 or the database 500 to read the initial image V1. In this embodiment, the photographing device 400 and the database 500 are external devices and are independent from the electronic device 200. In another implementation, the photographing device 400 and the database 500 may be integrated into the electronic device 200 to be systematized.

In an embodiment, the photographing device 400 is a network camera, and the database 500 is a cloud database (as shown in FIG. 3). After being initialized, the photographing device 400 can be connected to the database 500 for remote communication via the Internet, and login to capture and store images after the authentication procedure (for example, login account and password) is completed. The database 500 can be the cloud database, a local database (as shown in FIG. 4) of the electronic device 200, or both the local database of the electronic device 200 and the cloud database (not shown).

During performing the processing method 100, in the step 101 of identifying a preset object, in the step 101 of identifying the preset object, the preset object P is recognized by artificial intelligence from an initial image V1 captured by the photographing device 400. Then, the step 102 of image filtering is performed. In an embodiment, the preset object is, but not limited to, an infant or a young child. The preset object P can be two or more people. The preset object P can be at least one infant and at least one adult. After the photographing device 400 is activated, the step 101 of identifying the preset object will cycle for a predetermined time (for example, 30 seconds). If the photographing device 400 recognizes the preset object P in the initial image V1 within the predetermined time, then the step 102 of image filtering is performed. If no preset object P is recognized in the initial image V1 in the predetermined time, then the step 101 of identifying the preset object is repeated in the next predetermined time. When no preset object P is identified in the initial image V1 in the predetermined time, the last preset object P identified at the last predetermined time will be compared; however, if no preset object P is identified at the last predetermined time, it is defined as no data. The artificial intelligence recognition is performed, for example, through a neural network (Artificial Neural Network, ANN).

In the step 102 of image filtering, a filter condition is set. The filter condition includes detecting a movement variable of the preset object in the initial image, and when the filter condition meets a threshold, a catch moment in the initial image is selected. In an embodiment, the movement variable includes a movement level index (MLI) and a movement proportion index (MPI). In an embodiment, the threshold includes a first threshold and a second threshold.

Figure 7:
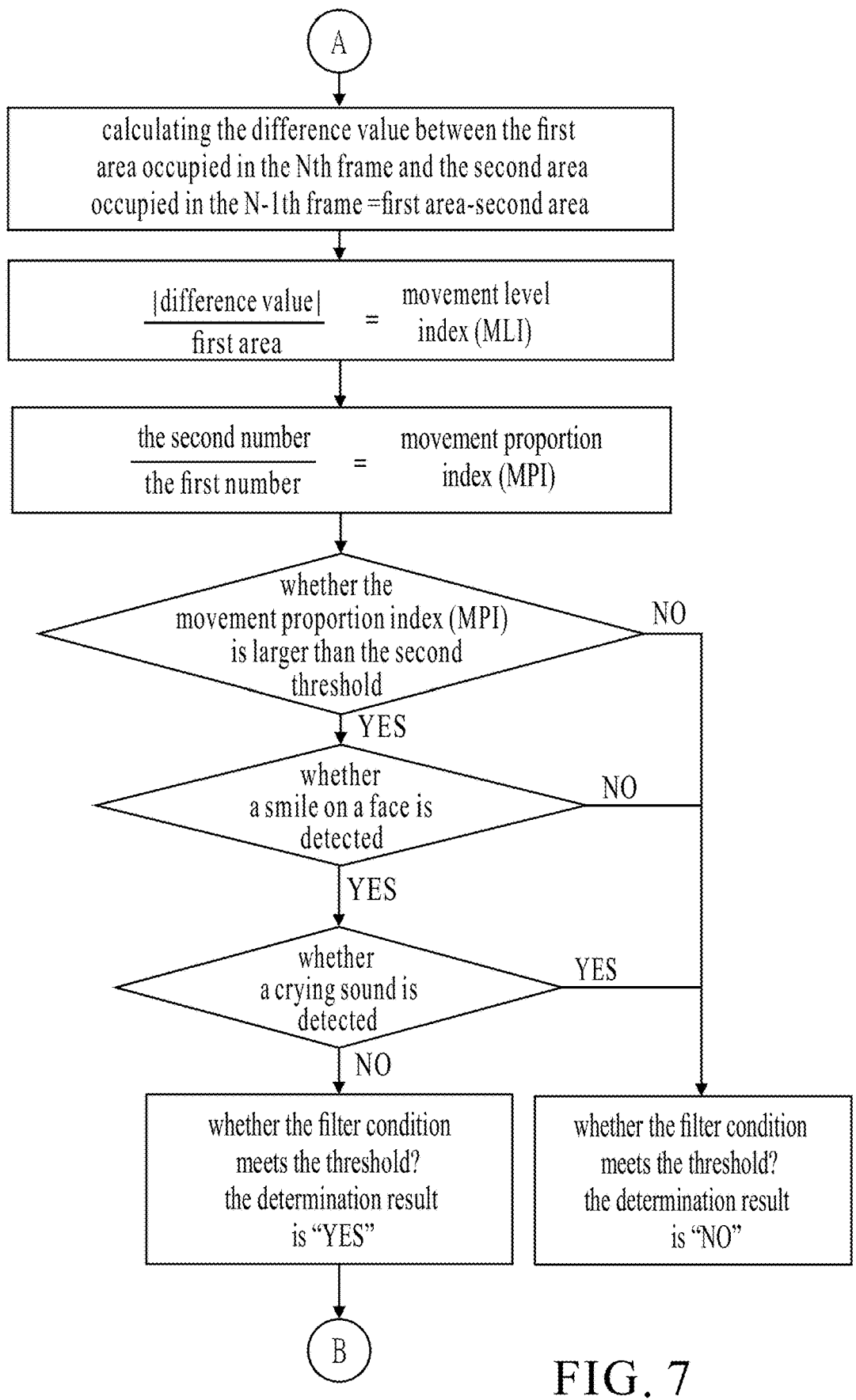
FIG. 7 is a block diagram showing the identification of the filter condition according to an embodiment of the present disclosure.
Figure 8:
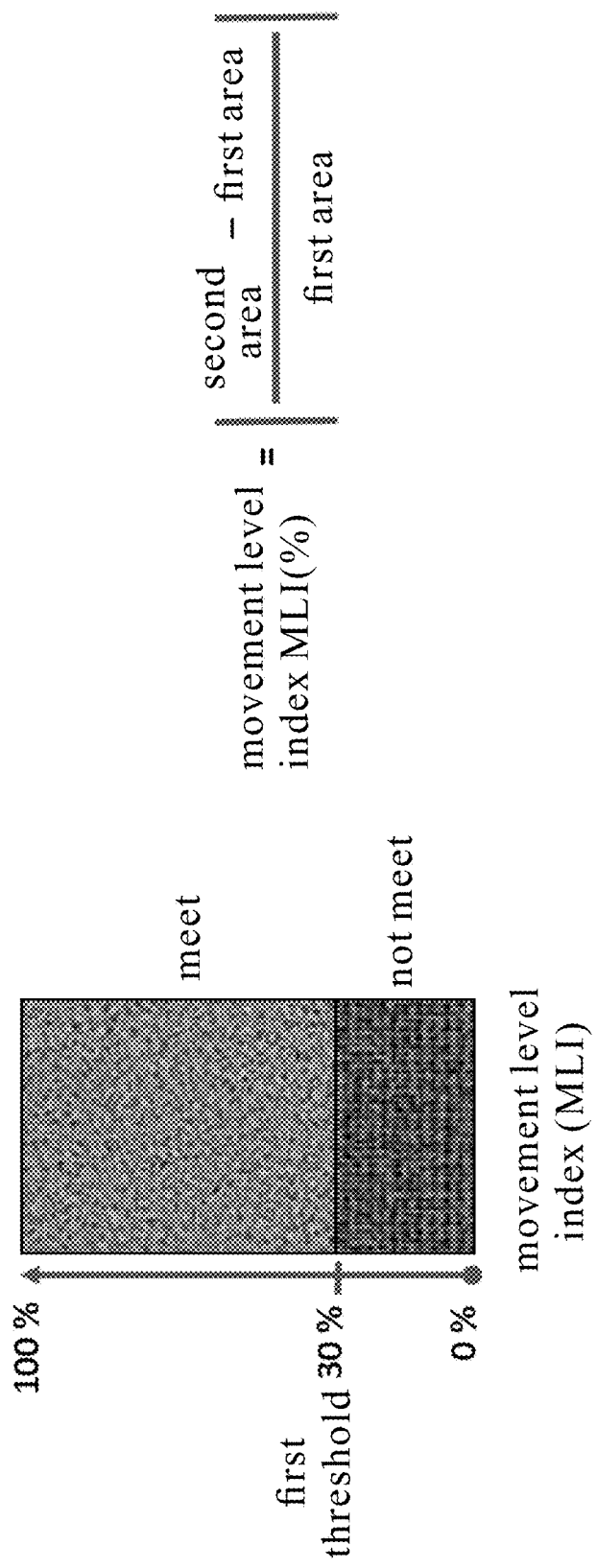
FIG. 8 is a block diagram showing whether a movement level index meets the first threshold according to an embodiment of the present disclosure.
Figure 9:
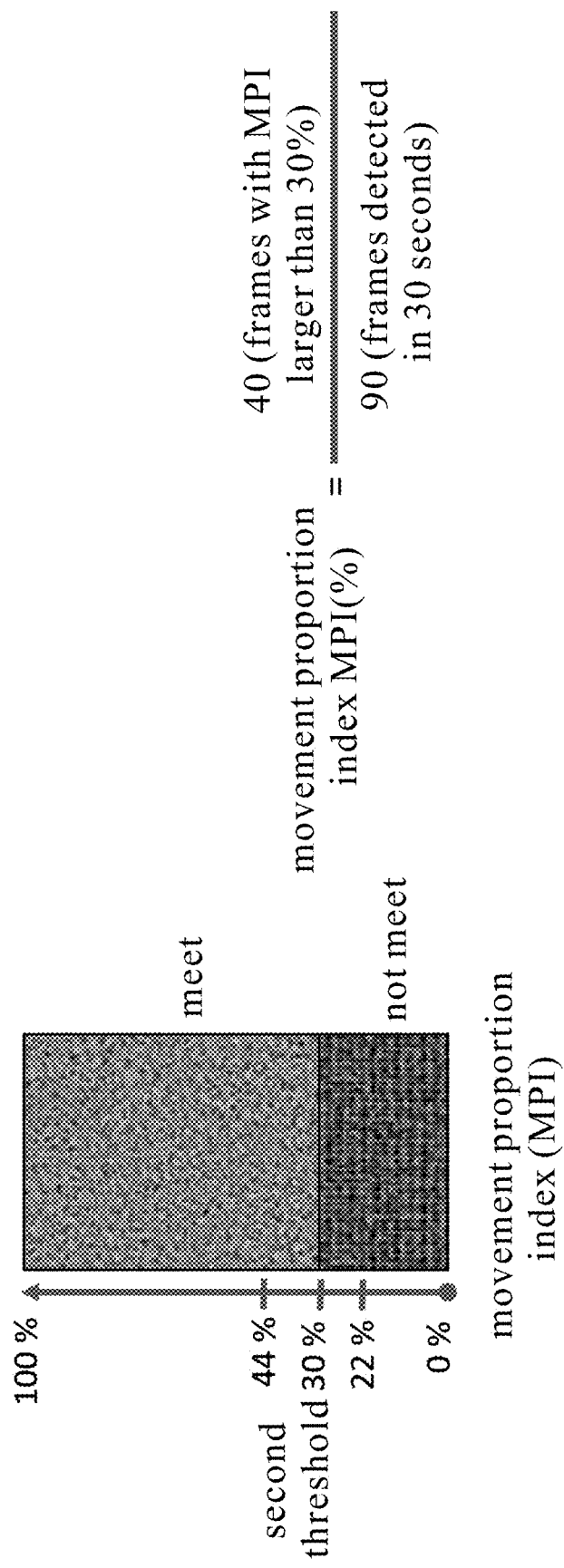
FIG. 9 is a block diagram showing whether a movement proportion index meets the second threshold according to an embodiment of the present disclosure.

From a first number of frames containing the preset object within a predetermined period of time in the initial image, a difference value between a first area A1 occupied by the preset object in an Nth frame of image and a second area A2 occupied by the preset object in an N−1th frame of image is calculated, and the difference value is divided by the first area A1 to obtain the movement level index (as shown in FIG. 7).

Figure 5:
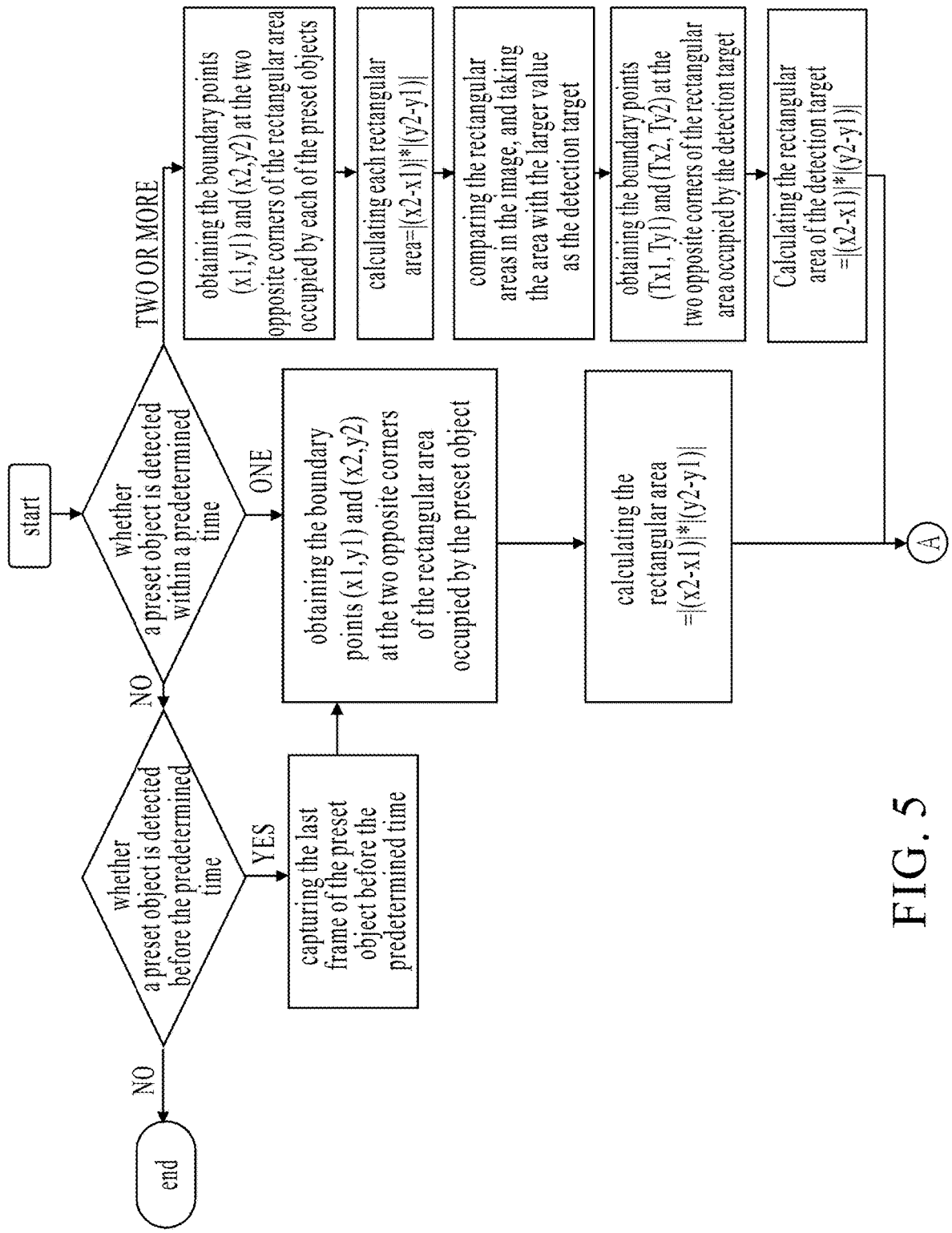
FIG. 5 is a block diagram showing area calculation of a rectangular range according to an embodiment of the present disclosure.
Figure 6B:
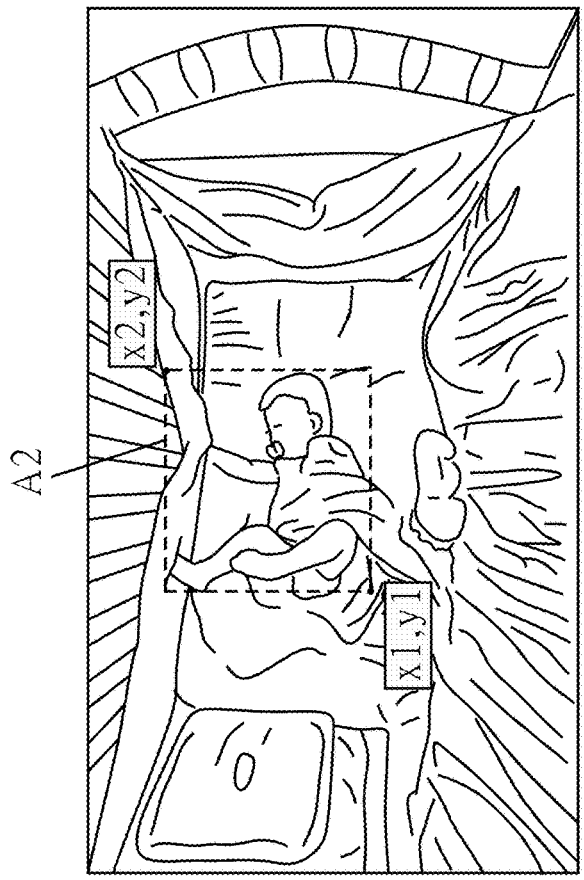
FIG. 6B is a schematic view showing a rectangular area after the infant moves according to an embodiment of the present disclosure.
Figure 6A:
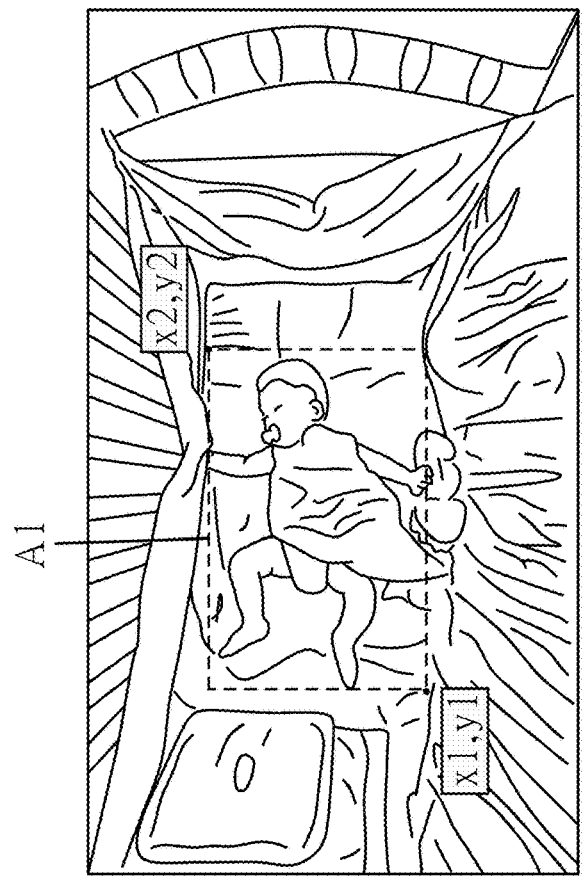
FIG. 6A is a schematic view showing a rectangular area before the infant moves according to an embodiment of the present disclosure.

In an embodiment, the first area A1 and the second area A2 are respectively a rectangular area enclosed by four boundary points, and the rectangular area is defined as the smallest area which covers the preset object P. Referring to FIG. 6A, FIG. 6B and FIG. 5, when the photographing device 400 identifies a preset object P in the initial image V1 within the predetermined time, the rectangular range occupied by the preset object P is obtained from the initial image V1 and has the boundary points (x1, y1) and (x2, y2) at the two opposite corners, and then the area of the rectangular area (formula: area=|(x2−x1)|*|(y2−y1)|) is calculated. When the photographing device 400 identifies two or more preset objects P (not shown) in the initial image V1 within the predetermined time, the rectangular range occupied by each preset object P is obtained from the initial image V1 and has the boundary points (x1, y1) and (x2, y2) at the two opposite corners, the area of each rectangular area is calculated, and then the rectangular areas within the image are compared. The area with the larger value is taken as the detection target, the boundary points (Tx, Ty1) and (Tx2, Ty2) at the two opposite corners of the rectangular area occupied by the detection area are obtained, and the area of the rectangular area of the detection target is calculated (formula: area=(Tx2−Tx1)*(Ty2−Ty1)).

A number of the frames which respectively have the difference value greater than the first threshold are defined as a second number of frames, and the second number is divided by the first number to obtain the movement proportion index. The filter condition is met when movement proportion index is greater than the second threshold, referring to FIG. 7. For example, in the case that the first number of frames are 90 frames captured within 30 seconds (the predetermined time) and the first threshold is 30% (shown in FIG. 8), if 40 frames in the 90 frames respectively have the difference value (MLI) of the areas greater than 30%, then the movement proportion index (MPI) is 44%. When the second threshold is 30% (shown in FIG. 9) and the movement proportion index (44%) is larger than the second threshold, the filter condition is met. In another case, if only 20 frames in the 90 frames respectively have the difference value of the areas greater than 10% (the first threshold), then the movement proportion index is 22%. The movement proportion index (22%) is les s than the second threshold (30%), and thus the filter condition is not met. In other words, in the video within 30 seconds of each predetermined time, the catch moment will be determined in the case that the movement change of the preset object P must meet the movement proportion index being larger than 30%, so as to ensure that the preset object P in the video have a high degree of movement variation.

Figure 11A:
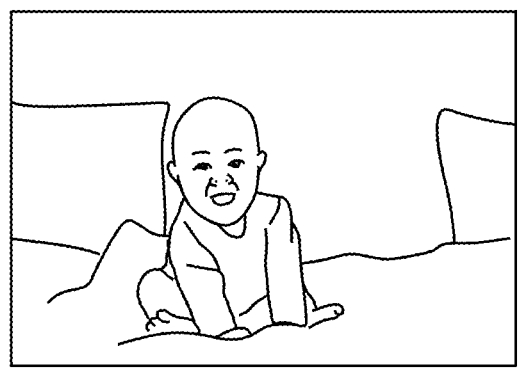
FIG. 11A is a schematic view showing that the catch moment meets the filter condition according to an embodiment of the present disclosure.
Figure 11B:
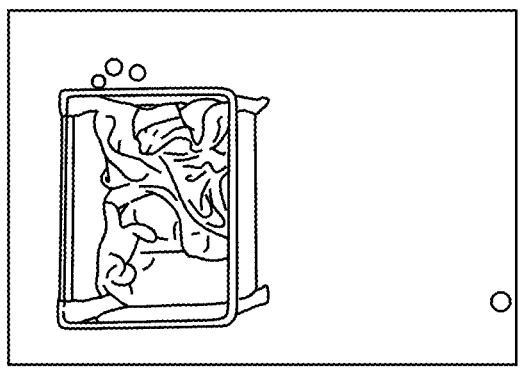
FIG. 11B is a schematic view showing that the catch moment does not meet the filter condition according to an embodiment of the present disclosure.
Figure 11C:
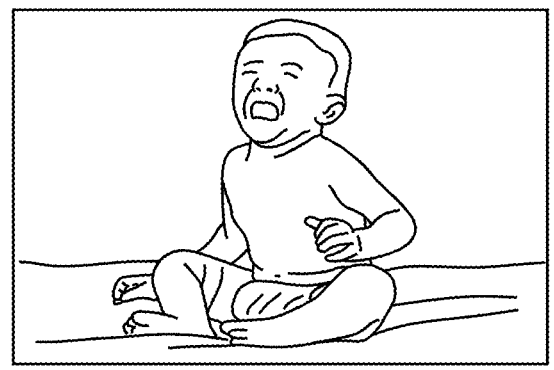
FIG. 11C is a schematic view showing that the catch moment does not meet the filter condition according to another embodiment of the present disclosure.

In an embodiment, the filter condition further includes the initial image V1 at least having a face of the infant and an ambient volume measured from the infant which is within a volume range. Further, the filter condition includes whether a smile on the infant's face is detected, and whether the infant's cry is detected. In the case that the movement proportion index is larger than the second threshold, if a smile on the infant's face is detected (the determination result is "YES") and no cry is detected (the determination result is "NO"), then the filter condition meets the threshold (the determination result is "YES"). In the case that the movement proportion index is larger than the second threshold, if no smile is detected (the determination result is "NO") or a cry is detected (the determination result is "YES"), then the filter condition does not meet the threshold (the determination result is "NO"). As shown in FIG. 10, which shows a screen 201 displaying the background of the electronic device 200, wherein the viewing angle, the ambient volume, whether the infant is in the scene, the movement variable (the movement level index (MLI) and the movement proportion index (MPI)), the type of the preset object (adult/infant), facial expressions (such as smiles), and events (whether there is crying) are listed. FIG. 11A is a schematic view showing the image of the infant at the catch moment which meets the filter condition; FIG. 11B is a schematic view showing the image at the catch moment which does not meet the filter condition; and FIG. 11C is a schematic view showing the image at the catch moment which does not meet the filter condition because the infant's cry is detected.

Figure 12:
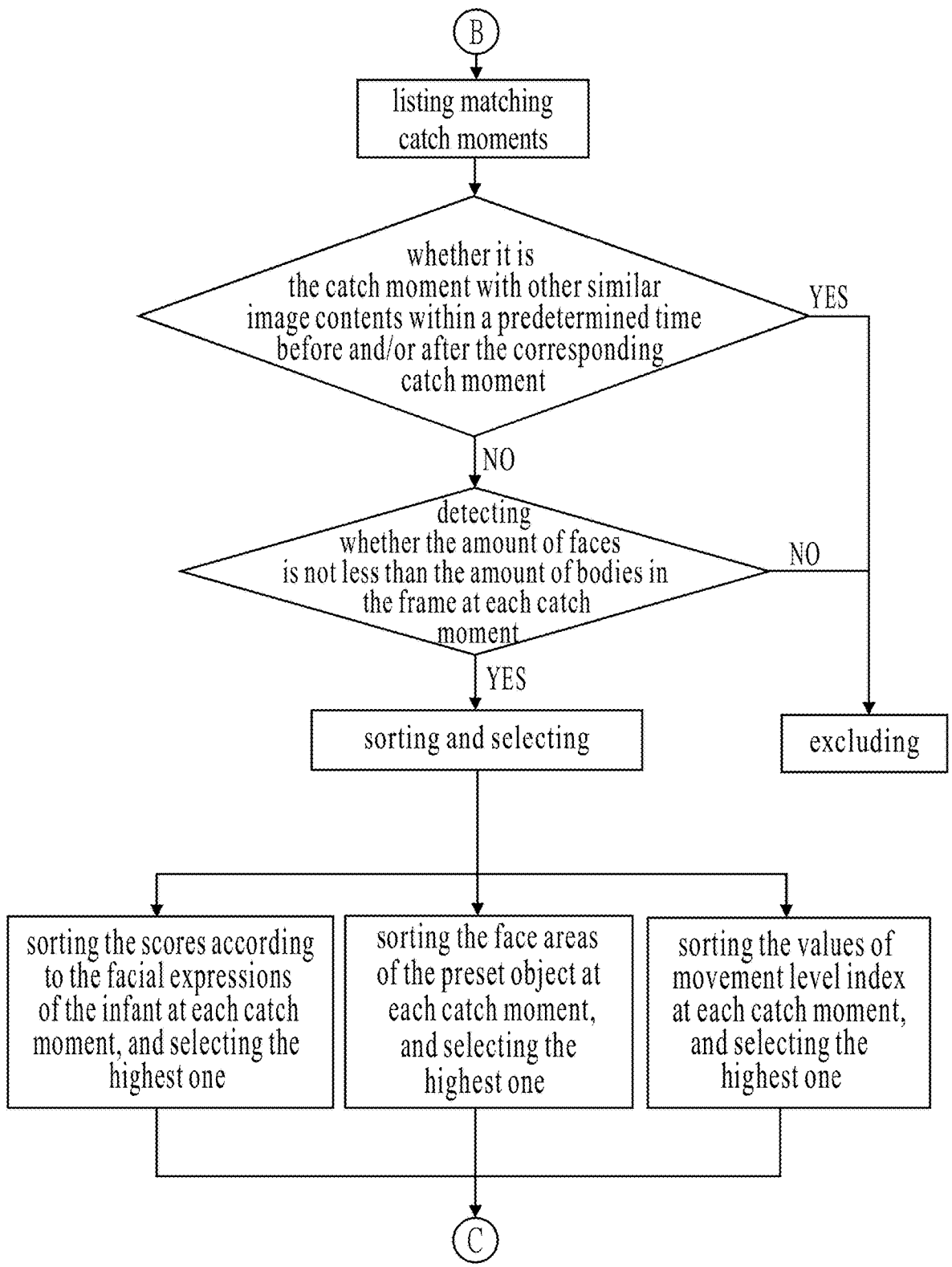
FIG. 12 is a block diagram showing the selection of the catch moment according to an embodiment of the present disclosure.

Further, in the step 102 of image filtering, based on the catch moment at which the video clip is selected, similar videos at other catch moments within a predetermined time before and/or after the catch moment are set to be excluded, referring to FIG. 12. For example, the predetermined time is in a range from 30 seconds to 2 minutes. In the case that the predetermined time is 1 minute, then within 1 minute before and/or after the catch moment, even if there are images which meet the filter condition, they are set to be excluded and not selected.

Figure 13:
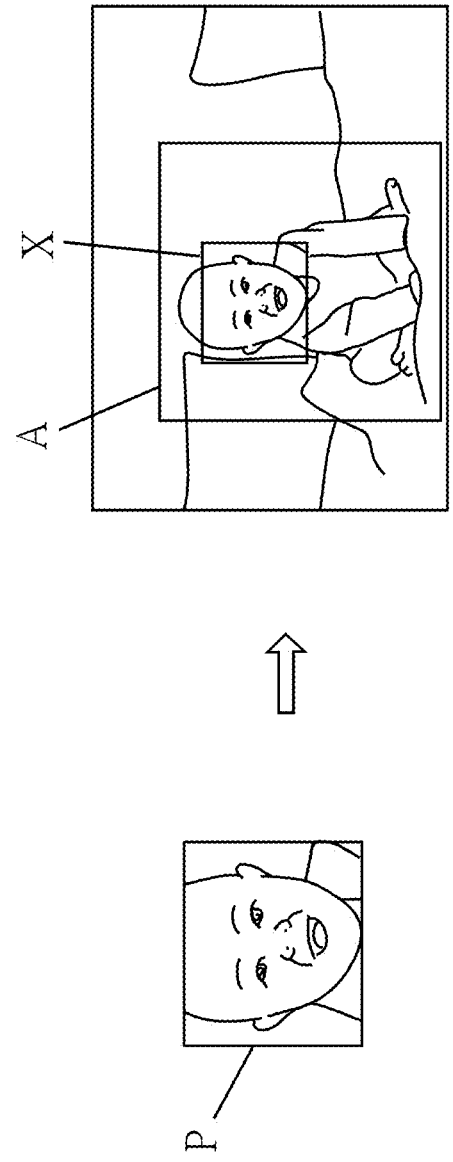
FIG. 13 is a schematic view showing the selection of catch moment for the infant in the background of the electronic device according to an embodiment of the present disclosure.

In the detection of the infant's face in the initial image V1, according to the screen 201 shown in FIG. 13 (also referring to the following Table 1A and Table 1B) which show the data listed at the reference time 03:52:19, the coordinate points x1, y1, x2, y2 being {1446, 29, 1494, 85}, and the confidence value score being 0.69 (total score of 1), the face X of the infant is detected and determined. In an embodiment, according to the coordinate points x1, y1, x2, y2 being {1389, 6, 1869, 447} and the confidence value score being 0.96, the body A of the infant is detected and determined. At the same time, the coordinate points x1, y1, x2, y2 of body B, body C, face Y and face Z are all {0, 0, 0, 0}, and the confidence score is also 0, such that the number of detected faces is 1, and the number of bodies is also 1.

TABLE 1A (The right side of Table 1A is connected to the left side of Table 1B.)

| Basic information | | | | | | | [body A] score and position | | | | | [body B] score and position | | | | |
|---|---|---|---|---|---|---|---|---|---|---|---|---|---|---|---|---|
| date | time | MLI | MPI | db | smile | cry | score | x1 | y1 | x2 | y2 | Score | x1 | y1 | x2 | y2 |
| xxxx/xx/xx | 03:52:03 | 0.15 | 0.3 | 72.74 | 0.93 | 0 | 0.98 | 1461 | 4 | 1896 | 450 | 0.52 | 1203 | 695 | 1497 | 825 |
| xxxx/xx/xx | 03:52:19 | 0.33 | 0.09 | 72.74 | 1 | 0 | 0.96 | 1389 | 6 | 1869 | 447 | 0 | 0 | 0 | 0 | 0 |
| xxxx/xx/xx | 03:52:22 | 0.4 | 0.13 | 72.74 | 0 | 0 | 0.92 | 1509 | 42 | 1791 | 445 | 0.61 | 1356 | 22 | 1557 | 409 |
| xxxx/xx/xx | 04:36:46 | 0.45 | 0.21 | 72.74 | 0 | 0 | 0.94 | 1434 | 11 | 1803 | 456 | 0.58 | 1338 | 27 | 1524 | 380 |
| xxxx/xx/xx | 04:14:51 | 0.18 | 0.19 | 72.74 | 1 | 0 | 0.87 | 1512 | 0 | 1806 | 445 | 0.59 | 1203 | 699 | 1491 | 825 |

| | [body C] score and position | | | | |
|---|---|---|---|---|---|
| | Score | x1 | y1 | x2 | y2 |
| xxxx/xx/xx | 0 | 0 | 0 | 0 | 0 |
| xxxx/xx/xx | 0 | 0 | 0 | 0 | 0 |
| xxxx/xx/xx | 0.49 | 1200 | 693 | 1497 | 825 |
| xxxx/xx/xx | 0.51 | 1200 | 693 | 1494 | 825 |
| xxxx/xx/xx | 0.52 | 1338 | 27 | 1557 | 400 |

TABLE 1B

| [face X] score and position | | | | | [face Y] score and position | | | | | [face Z] score and position | | | | | Number of | | |
|---|---|---|---|---|---|---|---|---|---|---|---|---|---|---|---|---|---|
| Score | x1 | y1 | x2 | y2 | Score | x1 | y1 | x2 | y2 | Score | x1 | y1 | x2 | y2 | Infant bodies | Adult bodies | faces |
| 0.65 | 1416 | 29 | 1455 | 96 | 0.58 | 1674 | 9 | 1758 | 78 | 0 | 0 | 0 | 0 | 0 | 1 | 1 | 2 |
| 0.69 | 1446 | 29 | 1494 | 85 | 0 | 0 | 0 | 0 | 0 | 0 | 0 | 0 | 0 | 0 | 1 | 0 | 1 |
| 0.57 | 1419 | 27 | 1470 | 101 | 0.52 | 1452 | 20 | 1497 | 83 | 0.51 | 1668 | 27 | 1713 | 108 | 2 | 1 | 3 |
| 0.93 | 1641 | 24 | 1698 | 110 | 0.72 | 1413 | 29 | 1455 | 92 | 0 | 0 | 0 | 0 | 0 | 2 | 1 | 2 |
| 0.69 | 1419 | 31 | 1458 | 94 | 0.67 | 1644 | 18 | 1698 | 96 | 0 | 0 | 0 | 0 | 0 | 1 | 2 | 2 |

In an embodiment, if there are two or more preset objects P including at least one infant and at least one adult, the filter condition further includes the calculation of the amounts of the faces and bodies of infants in the initial image V1 and the amounts of the faces and bodies of adults in the initial image V1, and further detecting whether the amount of the faces of the infant and the adult is not less than the amount of the bodies of the infant and the adult (referring to FIG. 12).

Figure 14:
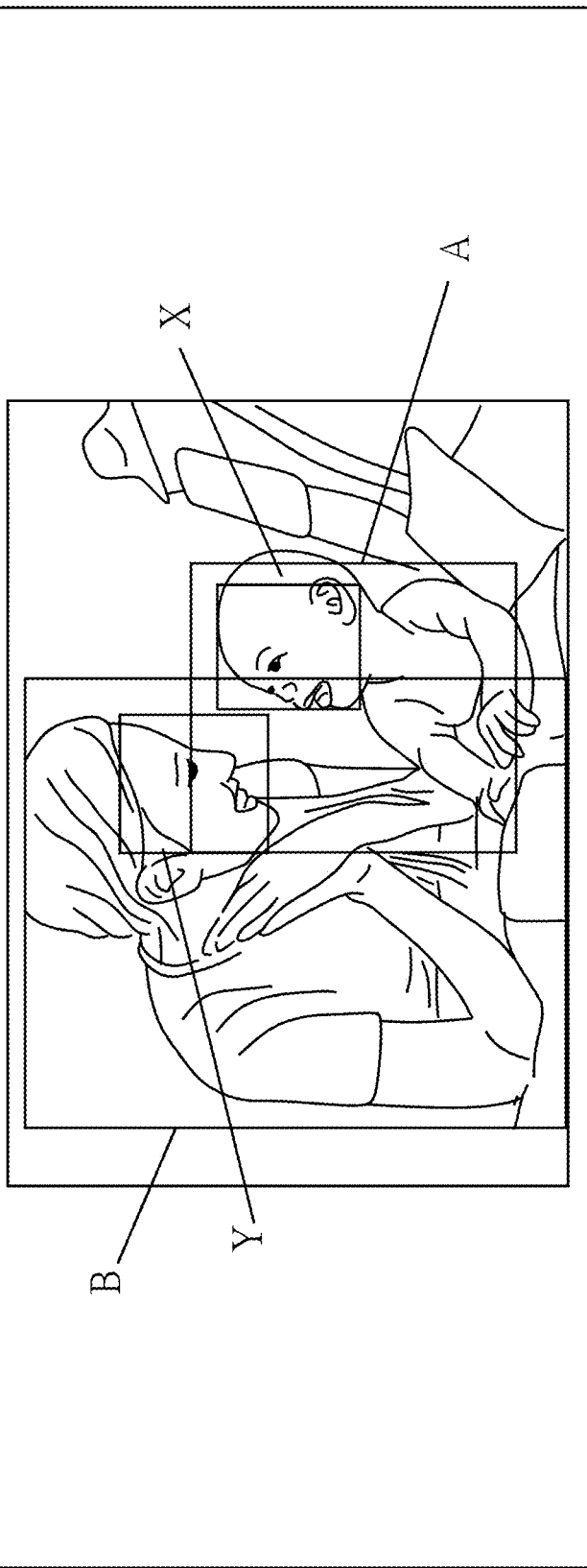
FIG. 14 is a schematic view showing the selection of catch moment for the infant and the adult in the background of the electronic device according to an embodiment of the present disclosure.

In the detection of the faces and bodies of the infant and the adult, according to the screen 201 shown in FIG. 14 (also referring to the following Table 1A and Table 1B) which show the data listed at the reference time 03:52:03, the coordinate points x1, y1, x2, y2 being {1461, 4, 1896, 450}, and the confidence value score being the body A of the infant is detected and determined. According to the coordinate points x1, y1, x2, y2 being {1416, 29, 1455, 96} and the confidence value score being the face X of the infant is detected and determined. According to the coordinate points x1, y1, x2, y2 being {1203,695,1497, 825} and the confidence value score being 0.52, the body B of the adult is detected and determined. According to the coordinate points x1, y1, x2, y2 being {1674, 9, 1758, 78} and the confidence value score being 0.58, the face Y of the adult is detected and determined. At the same time, the coordinate points x1, y1, x2, y2 are {0, 0, 0, 0} of the body C and the face Z, and the confidence value score is 0.

Based on the above, according to the data listed at 03:52:03, it shows that the number of faces of infants and the number of faces of adults detected are 1, respectively, and the number of bodies of infants and the number of bodies of adults detected are 1, respectively. Thus, the number of faces of infants and adults is 2 which is equal to the number of bodies of infants and adults. The filter condition is met. In this case, the determination result in FIG. 12 is "YES" for the number of faces being not less than the number of bodies.

Further, in the case that in another initial image V1 (not shown), the number of faces of infants and the number of bodies of infants detected are 1, respectively, and the number of faces of adults detected is 1 and the number of bodies of adults detected is 0, the number of the faces of the infants and the adults is 2 larger than the number of bodies of the infants and adults. The filter condition is met. In this case, the determination result in FIG. 12 is "YES" for the number of faces being not less than the number of bodies.

In the case that in another initial image V1 (not shown), the number of faces of infants detected is 1 but the number of the faces of adults is 0, even if the number of bodies of infants and the number of bodies of adults are 1, respectively, then the number of the faces of the infants and the adults is 1 less than the number of bodies of the infants and adults. In this case, the determination result in FIG. 12 is "NO" for the number of faces being not less than the number of bodies. In this way, when the number of the preset objects P is two or more, only the person with the face shown will be selected, and there will be no image of a person who only has a body without a face.

Figure 15:
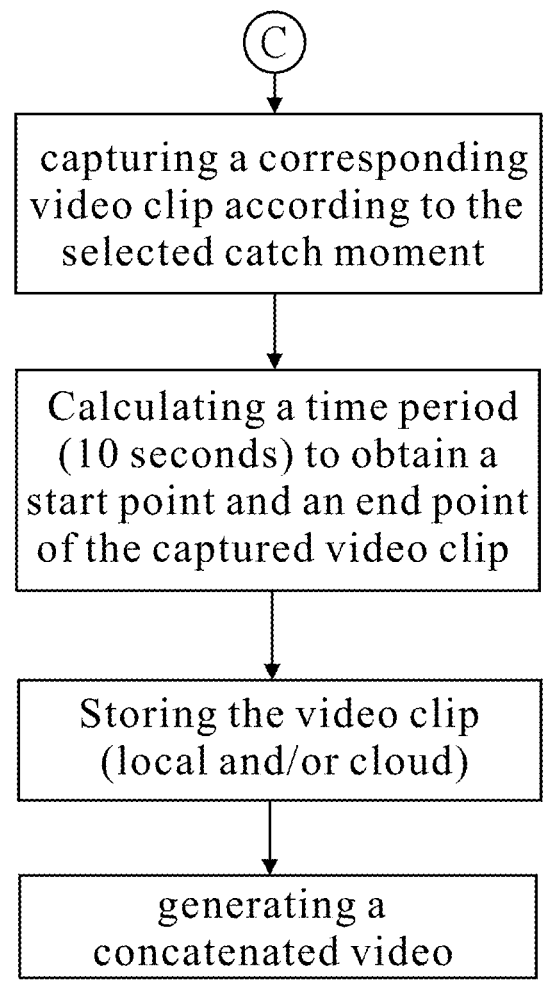
FIG. 15 is a block diagram showing the generation of the concatenated video from the video clips according to an embodiment of the present disclosure.
Figure 16:
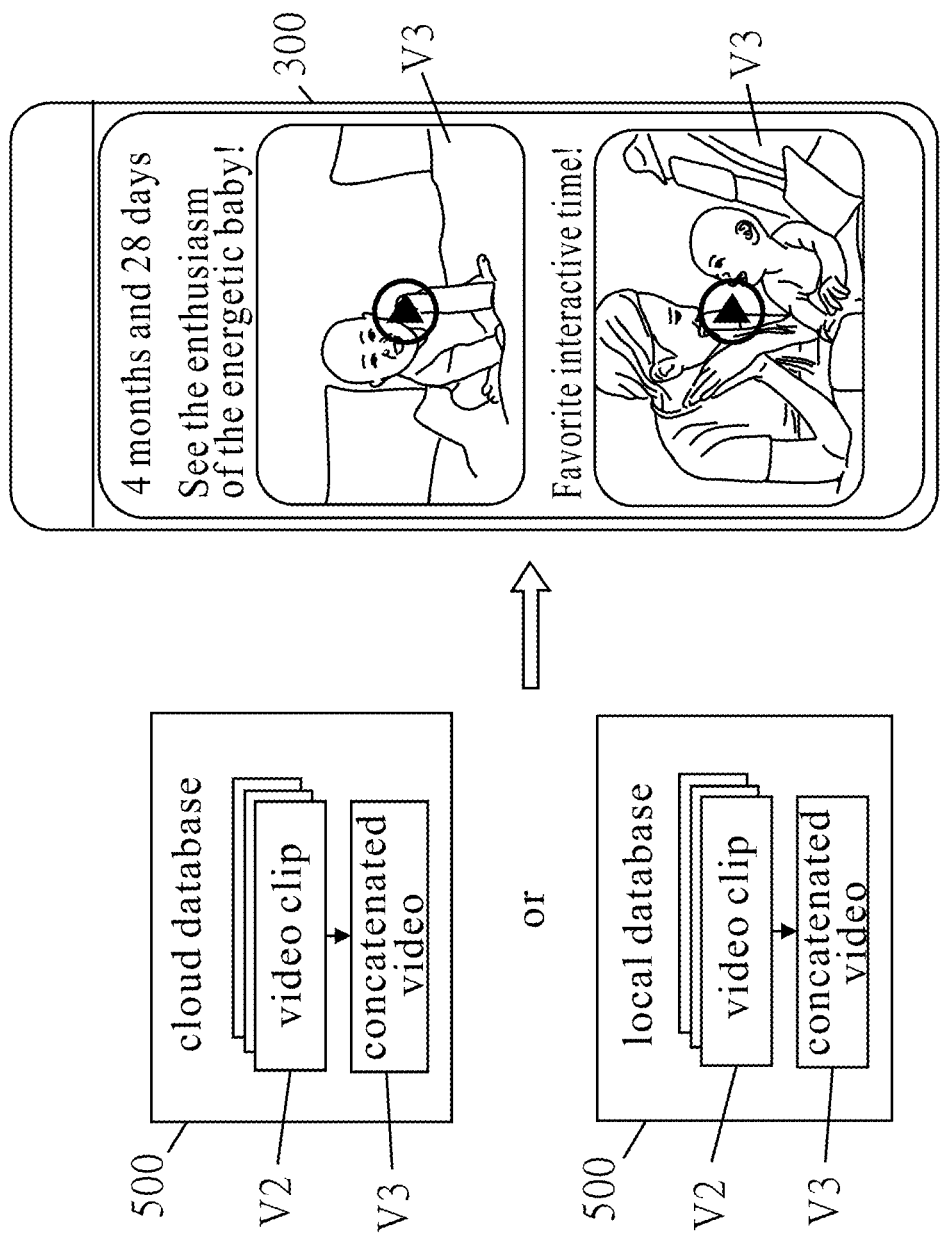
FIG. 16 is a schematic view showing the concatenated video being pushed to a terminal device according to an embodiment of the present disclosure.

In the step 103 of concatenating videos, a least one video clip V2 in the initial image is selected according to the catch moment, and the at least one video clip V2 is assembled to form the concatenated video V3 (shown in FIG. 15).

In an embodiment, in the step 103 of concatenating videos, a start point of the video clip V2 is set at a first time point which is a time period before the catch moment, and/or an end point of the video clip V2 is set at a second time point which is the time period after the catch moment. In an embodiment, in the case that the time period is 5 seconds, the length of the video clip is 10 seconds from the start point (which is 5 seconds forward from the catch moment) to the end point (which is 5 second afterward from the catch moment).

Further, in the selection of the video clip, the scores are sorted according to the facial expressions of the infant at each catch moment, and the highest one is selected. Alternatively, the values of the movement level index at each catch moment are sorted, and the highest one is selected. Alternatively, the face areas of the preset object P at each catch moment are sorted, and the highest one is selected. In the case that the scores are sorted according to the facial expressions of the infant at each catch moment, taking a smile as an example, when the infant's facial expression is a smile, the score is assumed to be 0.3, but when the infant's facial expression is a big laugh, the score is assumed to be 1. The scores are sorted and the highest one is selected. In the case that the values of the movement level index at each catch moment are sorted according the detected movement level index, and the face areas of the preset object P at each catch moment are sorted, the highest one is selected. Hence, at the selected catch moment, the person not only with a smile but also with a big laugh is selected. It can also be a person with a movement and the movement level index is large. Alternatively, it can also be a person with the largest face area in addition to the facial expression.

In an embodiment, there are multiple catch moments, multiple video clips V2 captured at the multiple catch moments are stored in the local database of the electronic device 200 and/or a cloud database, and the multiple video clips V2 are concatenated to form a concatenated video V3.

In an embodiment, the database 500 further includes an intelligent body identification sub-database 501 for identifying a body of the infant, an intelligent face identification sub-database 502 for identifying a face of the infant, an intelligent crying sound identification sub-database 503 for identifying a crying sound of the infant, and/or an intelligent smile identification sub-database 504 for identifying a smile of the infant.

The terminal device 300 can be a portable communication device, for example, a smart phone, a tablet or a laptop, to communicate with the wireless communication unit 20 of the electronic device 200 via the Internet. The terminal device 300 carries an application program 301, and the terminal device 300 executes the application program 301 and performs an identification procedure (for example, login an account with a password) to receive a push broadcast of the concatenated video V3 from the electronic device 200 (shown in FIG. 16).

The features of the present disclosure are illustrated as follows.

1. In the dynamic image processing method and the electronic device, the filter condition includes a movement variable, and the preset object in the initial image must have a predetermined movement change to meet the threshold. When the threshold is met, a catch moment is selected. In the video clips selected at the catch moments, the preset object P can have a more dynamic movement, thereby generating a concatenated video V3 with rich changes in the movements of the preset object P, so as to meet the user's expectation. Further, the concatenated video V3 can be pushed and broadcasted to the terminal device in communication with the electronic device, and can be played by the terminal device.

Further, in the dynamic image processing method and the electronic device, sorting and filtering can be performed according to the level of filter condition, so as to select the high level or the low level from the filter condition, so that the generated concatenated video V3 can better meet the user's expectation.

In addition, if there are two or more preset objects P including at least one infant and at least one adult in the image, the number of faces being not less than the number of bodies meets the filter condition, so as to ensure that at least the face of each preset object P can be seen in the video clip at the catch moment, and even when the generated concatenated video V3 has multiple preset objects P, it can still meet the user's expectation.

While the present disclosure has been described by means of preferable embodiments, those skilled in the art should understand the above description is merely embodiments of the disclosure, and it should not be considered to limit the scope of the disclosure. It should be noted that all changes and substitutions which come within the meaning and range of equivalency of the embodiments are intended to be embraced in the scope of the disclosure. Therefore, the scope of the disclosure is defined by the claims.

What is claimed is:

1. A dynamic image processing method, which is executed by an electronic device communicating with a photographing device and reading an executable code to identify a preset object by using artificial intelligence, and perform dynamic image processing for the preset object, the dynamic image processing method comprising the following steps of:
   identifying the preset object, wherein the preset object is recognized by artificial intelligence from an initial image captured by the photographing device;
   image filtering, wherein a filter condition is set, the filter condition includes detecting a movement variable of the preset object in the initial image, and when the filter condition meets a threshold, a catch moment in the initial image is selected; and
   forming a concatenated video, wherein at least one video clip in the initial image is selected according to the catch moment, and the at least one video clip is assembled to form the concatenated video.

2. The dynamic image processing method according to claim 1, wherein the movement variable includes a movement level index (MLI) and a movement proportion index (MPI), and the threshold includes a first threshold and a second threshold, wherein from a first number of frames containing the preset object within a predetermined period of time in the initial image, a difference value between a first area occupied by the preset object in an Nth frame of image and a second area occupied by the preset object in an N−1th frame of image is calculated, and the difference value is divided by the first area to obtain the movement level index; a number of the frames which have the difference value greater than the first threshold are defined as a second number of frames, and the second number is divided by the first number to obtain the movement proportion index; and the filter condition is met when movement proportion index is greater than the second threshold.

3. The dynamic image processing method according to claim 2, wherein the first area and the second area are respectively a rectangular area enclosed by four boundary points, and the rectangular area is defined as a smallest area which covers the preset object.

4. The dynamic image processing method according to claim 3, wherein the preset object is an infant, and the filter condition further includes the initial image at least having a face of the infant.

5. The dynamic image processing method according to claim 4, wherein the filter condition further includes an ambient volume measured from the infant, and the filtering condition further includes that the ambient volume is within a volume range.

6. The dynamic image processing method according to claim 4, wherein the video clip is selected based on a score of the infant's facial expression at the catch moment, and a highest score is selected; or the video clip is selected based on a value of the movement level index at the catch moment, and a highest value is selected; or the video clip is selected based on a face area of the preset object at the catch moment, and a largest face area is selected.

7. The dynamic image processing method according to claim 3, wherein the preset object includes at least one infant and at least one adult, the filter condition further includes calculating an amount of faces of the infant and the adult and an amount of bodies of the infant and the adult, and the filter condition further includes comparing the rectangular area occupied by each of the infant and the adult in the frame when the amount of faces is not less than the amount of bodies, and using a bigger area to calculate the movement level index.

8. The dynamic image processing method according to claim 1, wherein in the step of image filtering, based on the catch moment at which the video clip is selected, similar videos at other catch moments within a predetermined time before and/or after the catch moment are set to be excluded.

9. The dynamic image processing method according to claim 1, wherein in the step of forming the concatenated video, a start point of the video clip is set at a first time point which is a time period before the catch moment, and/or an end point of the video clip is set at a second time point which is the time period after the catch moment.

10. The dynamic image processing method according to claim 9, wherein there are multiple catch moments, multiple video clips respectively selected at the multiple catch moments are stored in the electronic device and/or a cloud database, and the multiple video clips are concatenated into the concatenated video.

11. A terminal device for communicating with an electronic device that executes the method of claim 1, wherein the terminal device carries an application program, and the terminal device executes the application program to receive a push broadcast of the concatenated video from the electronic device.

12. An electronic device for processing dynamic images, in which the electronic device communicates with a photographing device and a database, the database receives an initial image captured by the photographing device and uses artificial intelligence to identify a preset object, and the electronic device performs dynamic image processing on the preset object, the electronic device comprising:
   an intelligent processing unit, electrically connected to the photographing device or the database for reading the initial image and reading and executing an executable code to set a filter condition for selecting a catch moment in the initial image when a threshold is met, wherein the filter condition includes a movement variable, and the intelligent processing unit selects at least one video clip according to the catch moment and assembles the at least one video clip to form a concatenated video.

13. The electronic device for processing dynamic images according to claim 12, wherein the movement variable includes a movement level index and a movement proportion index, and the threshold includes a first threshold and a second threshold, wherein from a first number of frames containing the preset object within a predetermined period of time in the initial image, a difference value between a first area occupied by the preset object in an Nth frame of image and a second area occupied by the preset object in an N−1th frame of image is calculated, and the difference value is divided by the first area to obtain the movement level index; a number of the frames which have the difference value greater than the first threshold are defined as a second number of frames, and the second number of frames are compared with the first number of frames to obtain the movement proportion index; and the filter condition is met when movement proportion index is greater than the second threshold.

14. The electronic device for processing dynamic images according to claim 12, wherein the database is a local database and/or a cloud database to which the electronic device belongs.

15. The electronic device for processing dynamic images according to claim 14, wherein the preset object at least includes an infant, and the database further includes an intelligent body identification sub-database for identifying a body of the infant, an intelligent face identification sub-database for identifying a face of the infant, an intelligent crying sound identification sub-database for identifying a crying sound of the infant, and/or an intelligent smile identification sub-database for identifying a smile of the infant.

16. A terminal device for communicating with the electronic device of claim 12, wherein the terminal device carries an application program, and the terminal device executes the application program to receive a push broadcast of the concatenated video from the electronic device.

* * * * *